(12) United States Patent
Heinrich et al.

(10) Patent No.: US 6,470,393 B1
(45) Date of Patent: Oct. 22, 2002

(54) INTERFACE FOR A DATA NODE OF A DATA NETWORK

(75) Inventors: Peter Heinrich, Rosenheim (DE); Burkhard Kuhls, München (DE)

(73) Assignees: STMicroelectronics GmbH, Grasbrunn (DE); Bayerische Moteren Werke AG, Munchen (DE)

(*) Notice: Subject to any disclaimer, the term of this patent is extended or adjusted under 35 U.S.C. 154(b) by 0 days.

(21) Appl. No.: 09/262,499

(22) Filed: Mar. 4, 1999

(30) Foreign Application Priority Data

Mar. 6, 1998 (DE) .......................... 198 09 726

(51) Int. Cl.[7] .............................................. B06F 13/00
(52) U.S. Cl. ...................................... 709/238; 709/244
(58) Field of Search ............................... 709/244, 238; 370/292, 351; 711/202

(56) References Cited

U.S. PATENT DOCUMENTS

| | | | | |
|---|---|---|---|---|
| 5,809,559 A | * | 9/1998 | Kim ........................... | 711/202 |
| 6,021,121 A | * | 2/2000 | Heinrich ..................... | 370/290 |
| 6,141,686 A1 | * | 10/2001 | Jackowski et al. ........... | 709/224 |
| 6,304,914 B1 | * | 10/2001 | Deo et al. ................... | 709/247 |
| 6,304,985 B1 | * | 10/2001 | Sindhushayana et al. ... | 714/702 |
| 6,314,099 B1 | * | 11/2001 | Fujisawa et al. ............ | 370/392 |

OTHER PUBLICATIONS

"CMOS Memory Products" *1991 Data Book/Handbook*, Advanced Micro Devices, Inc. pp. 1,5–3, and 5–20—5–22.

* cited by examiner

*Primary Examiner*—David Wiley
(74) *Attorney, Agent, or Firm*—Lisa K. Jorgenson; Robert Iannucci; SEED IP Law Group PLLC (57) ABSTRACT

An interface for a data node of a data network including a plurality of data nodes are connected to each other by way of a bus line and activatable in selective manner by address codes transmitted via the bus line. The interface includes an activating address filter allowing addresses intended for the associated data node to be recognized.

34 Claims, 3 Drawing Sheets

INTERFACE FOR A DATA NODE OF A DATA NETWORK

TECHNICAL FIELD

The invention relates to an interface for a data node of a data network, a data node provided with such an interface, and a data network comprising such data nodes. The data nodes of such a data network communicate with each other via a bus line interconnecting them, with each data node being capable of constituting a transmitter or a receiver.

BACKGROUND OF THE INVENTION

Networks have been used for some time in motor vehicles, where they are known under the term CAN (Car Area Network). Such CAN systems comprise two open or ring-line-like shared lines, namely a bus line for data and message communication and a voltage supply line for supplying a battery voltage to the individual nodes.

The individual data nodes usually comprise a data processing unit, in particular in the form of a microcontroller, and a voltage supply unit, in particular in the form of a voltage controller, with both the microcontroller and the voltage controller being coupled via an interface to the bus line and the voltage supply line, respectively.

The voltage controller and in particular also the microcontroller consume both a relatively high current in the active state. In case of a data network having all of its data nodes in the active state, this had the effect of a correspondingly high consumption of electrical energy. This would lead to relatively fast discharging of the vehicle battery, when the vehicle is not used for a longer period of time. This problem conventionally is counteracted by switching the individual data nodes to a quiescent state when their activity is not required and by bringing them from this quiescent state to the active state only when their activity is required. For example, in case of a vehicle at standstill, in particular when it has an alarm system, the door contacts are cyclically examined. Usually the term "waking up" is employed for this activation of data nodes.

When, in conventional CAN systems, data are sent from a data node via the bus line, all data nodes are awakened completely. In doing so, the voltage controller is activated in each data node via its interface in order to tap the operating voltage from the voltage supply line and to bring the microcontroller to the active mode of operation by feeding supply voltage thereto.

A message sent from a data node via the bus line contains an address part and a data part. The address part contains the addresses of the data nodes to be addressed with the respective message transmitted. An address may be intended for one single data node exclusively or for a predetermined choice of data nodes.

The individual data nodes are equipped with address filters by means of which they can recognize whether or not the address of the message transmitted via the bus line is an address intended for them.

Such an address selection or address filtering can be carried out, for example, by means of circuit arrangements and methods as indicated in the applicant's own German patent applications 196 45 055.1 and 196 45 057.8. the contents of which are herewith incorporated by reference herein. In such address selection methods, either the entire address bit sequence as a whole or individual segments of predetermined length of the address bit sequence are compared to address words or address segments, respectively, which are stored in the respective data node. If one data node is to be capable of accepting various address codes, either a number of address filters corresponding to the number of addresses or address segments to be accepted is required or, in addition to the filters, masks are employed determining for the individual filter bit locations whether acceptance of an address bit location received is to take place for them only when the address bit of the corresponding address bit location is in conformity with the associated filter bit location, or whether acceptance is to take place irrespective of whether or not there is conformity of the respective address bit location considered with the associated filter bit location.

With conventional CAN systems, address filtering takes place in the microcontroller. When data are transmitted from a data node, full waking up of all data nodes takes place in order to enable the microcontroller of each data node by activation thereof to carry out address filtering and to thus determine whether or not the message on the bus line causing waking up is intended for the particular data node. Since the voltage controllers, and in particular the microcontrollers, consume relatively large amounts of electrical energy in the active state, even a mode of operation in which, when the vehicle is inoperative, the data nodes are brought to a quiescent state and are awakened to the active state only from time to time, mostly in cyclic manner, still results in relatively high consumption of energy and a correspondingly high load on the vehicle battery. When such a vehicle is parked for a longer period of time, for example in an airport car park during a longer air travel, the vehicle battery may be discharged as early as after periods of 1 to 2 weeks by such cyclic waking up or activation of all data nodes.

SUMMARY OF THE INVENTION

It is an advantage of the invention to provide a remedy in this respect and to make available, in particular for CAN systems, a method resulting in lower consumption of energy and thus a prolonged energy supplying capacity of the vehicle battery also in case of inoperative intervals of the vehicle of longer duration.

According to an embodiment of the invention, the interface of each data node is equipped with an activating address filter so that activating address filtering for an activating demand transmitted via the bus line can be carried out already in the interface. This eliminates the necessity of waking up the entire data node, in particular the microcontroller, for activating address filtering and switching the same to the energy-consuming active state.

The interfaces of the individual data nodes require considerably less electrical energy than the microcontroller. In addition thereto, the interfaces can be held in a low-power status when no data are transmitted via the bus line. When an activating demand is transmitted via the bus, the interfaces of all nodes, in this embodiment, are set into an active state rendering possible activating address filtering or activating address identification. In this status, all interfaces examine whether the address part of the message transmitted via the bus line contains an address intended for them.

Only when an interface recognizes an activating address intended for its data node does it effect activation of its data node, e.g., by activating a voltage controller belonging to this data node and thus waking up of the associated microcontroller to the active state thereof.

Waking up of the interfaces to their state in which they are capable of performing activating address identification or filtering, is effected preferably by means of a characteristic frame start bit preluding the message frame of each message transmitted via the bus line.

Programming of the interface of a data node with respect to the address or addresses recognizable by the same can be effected by the associated microcontroller.

Due to the fact that the microcontrollers of conventional CAN systems have an address filter of their own, the correctness of the address identification carried out by the associated interface can be examined once more by the microcontroller after waking up of the same. However, with microcontrollers intended specifically for a data network with interfaces according to the invention, it is also possible to omit the address identification part since address filtering already takes place anyway in the interface arranged upstream thereof.

In a preferred embodiment, the individual interfaces are not only adapted to be awakened to their active state by the beginning of a message frame, but in addition thereto by an external wake-up signal. The latter may play a role, for example, when a data node belongs to one of the centrally lockable door locks and the door lock of this node is actuated for opening or closing this door. This has the effect that the door node belonging to this door lock is switched to the active state via the external wake-up signal and that this data node sends via the bus line a corresponding activation message to the data nodes associated with the other door locks, in order to cause opening or closing with respect to these additional door locks as well.

In a preferred embodiment, which is of inventive character irrespective of whether or not an interface of a data node is equipped with an address filter of its own, the interface comprises a bit clock recovering means through which the bit clock can be reconstructed from bit sequences received via the bus line. The interfaces of the CAN systems usually are provided with an oscillator of their own which, on the one hand for reasons of costs and on the other hand under the aspect of low energy consumption, are oscillators of relatively low frequency stability, for example RC oscillators. When retunable oscillators are employed therefor, these can be synchronized with this bit clock with the aid of the recovered bit clock.

In a particularly preferred embodiment of such a bit clock recovering means, a bit length counter is employed which receives, as counting clock, the oscillator signal of the interface oscillator and to which the bit change locations of the received bit sequence are reported. The count of the bit length counter reached during the duration of the start bit of the respective message frame is stored in a bit length memory, and the memory value thereof corresponds to the length of the start bit. After such bit length storage, the bit length counter is reset each time either when its count has reached the count stored in the bit length memory or when it receives information that an initial edge of a new bit has occurred in the bit sequence received, and it then starts to count anew. With each resetting operation, a bit change signal is issued at the output of the bit length counter, and these bit change signals represent the recovered bit clock.

Conventional microcontrollers comprise an oscillator of their own of high frequency stability, which in general is a quartz oscillator. Such oscillators not only involve energy consumption of their own but also are relatively expensive. In an embodiment of the invention which is of inventive character also irrespective of whether the interface of the respective data node is provided with an address filter of its own and/or with a bit clock recovering means, the microcontrollers of the individual data nodes have no oscillators of their own, but rather the microcontrollers are controlled by means of a clock obtained by means of a controllable oscillator which is under the control of characteristic quantities transmitted via the bus line. To this end, it is possible to make use of the bit clock of the respective bit sequence transmitted as recovered in the associated interface or to take recourse to the frame length or frame partial lengths of message frames transmitted via the bus line or of cyclically transmitted, specific frequency synchronization frames.

In a preferred embodiment of the present invention, a frame length counter is employed to which the oscillator output signal of a controllable oscillator is fed as counting clock directly or after division thereof by means of a divider, with a counting operation of the frame length counter being triggered by the frame start bit of the respective message or oscillation synchronization frame. The count reached by the frame length counter at the frame end represents the respective frame length actual value. By a comparison means, this frame length actual value is compared to a frame length nominal value, and with the aid of the deviation of the frame length actual value from the frame length nominal value possibly resulting from this comparison, retuning of the controllable oscillator is performed.

In systems whose transmitted bit sequences may be of different frame lengths, a bit counter can be used as assistance, which starting with the respective frame start bit counts a predetermined number of bits, using for example the recovered bit clocks, with the result of the comparison between the frame length actual value and the frame length nominal value being released for returning control of the controllable oscillator at the moment of time at which the bit counter has counted a predetermined number of bits since the occurrence of the frame start bit. This predetermined bit count is equal to or smaller than the bit number of the shortest possible frame of the bit sequences transmitted via the system.

An interface according to a first aspect of the invention, namely an interface having an activating address filter of its own, is indicated in claim 1. An interface according to a second aspect of the invention, namely an interface with bit clock recovery, is defined in claim 14. An interface according to a third aspect of the invention, in which clock generation for control of the associated data processing unit, in particular the associated microcontroller, takes place on the basis of a characteristic quantity of bit sequences received via the bus line, is indicated in claim 22. Data nodes having such interfaces are indicated in claims 26, 32, 36 and data networks comprising corresponding data nodes are indicated in claims 38, 41, 42. Advantageous developments of the individual aspects of the invention are defined in dependent claims.

BRIEF DESCRIPTION OF THE DRAWINGS

The individual aspects of the invention as well as associated further aspects of objects and advantages will now be elucidated in more detail by way of embodiments shown in the associated drawings.

DETAILED DESCRIPTION OF THE INVENTION

Figure 1:
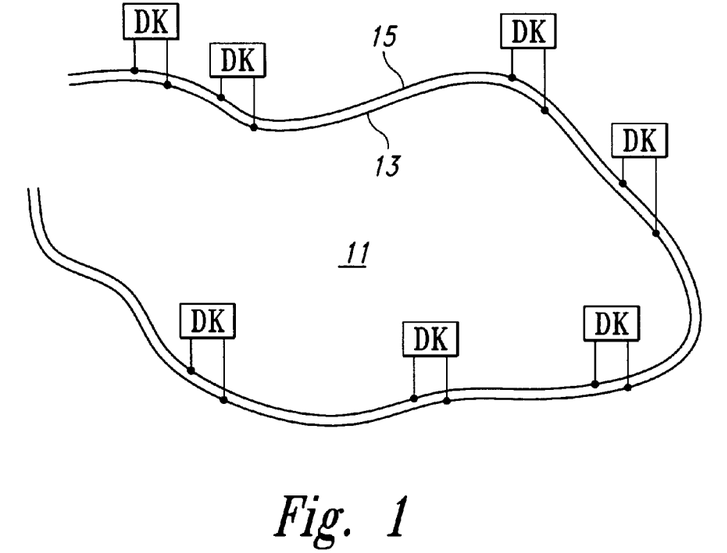
FIG. 1 shows a schematic representation of an example of a data network with data nodes and interfaces that may be designed according to the invention.

A data network 11, for example a CAN data network, as shown in FIG. 1 comprises a multiplicity of data nodes DK which are connected to each other in ring-like manner, in terms of data via a data bus 13 and in terms of energy supply via a voltage Supply line 15. Each data node DK may assume the function of a transmitter or the function of a receiver.

Figure 2:
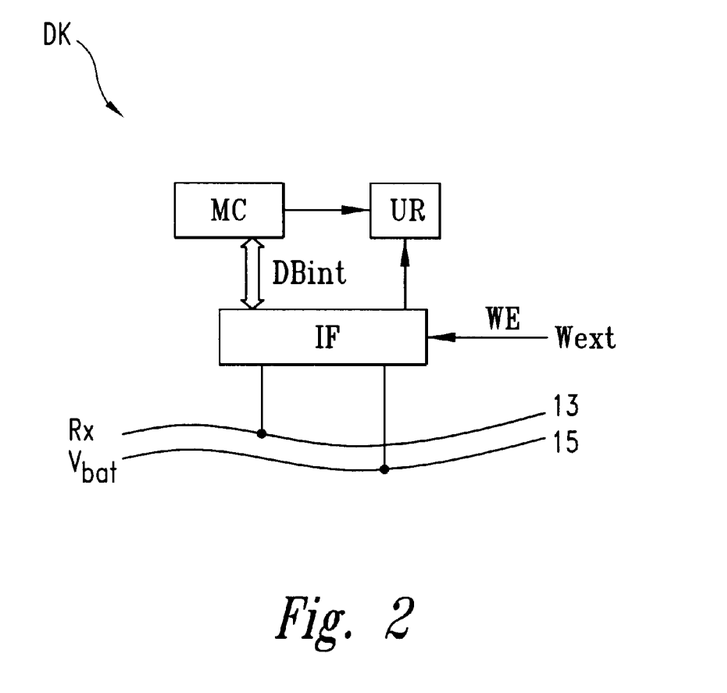
FIG. 2 shows a block diagram of an embodiment of a data node that may be designed according to the invention.

An individual data node DK comprising a data processing unit in the form of a microcontroller MC, a voltage controller UR and an interface IF is shown in FIG. 2 in the form of a block circuit diagram, with interface IF being connected on the one hand to data bus 13 and on the other hand to voltage supply line 15. Interface IF is in data communication with microcontroller MC via an internal data bus DBint. Microcontroller MC is fed with operating voltage from voltage controller UR when interface IF releases a connection between voltage supply line 15 and voltage controller UR. Such a release effects waking up of microcontroller MC to the active state thereof, whereas otherwise microcontroller MC is in the energy-saving quiescent state. Such waking up or activating of microcontroller MC takes place either when an activating address filter means of interface IF has recognized that the address of a bit sequence transmitted via data bus 13 is intended to activate or wake up the associated microcontroller or when interface IF is fed with an external wake-up signal Wext via a wake-up input WE.

Figure 3:
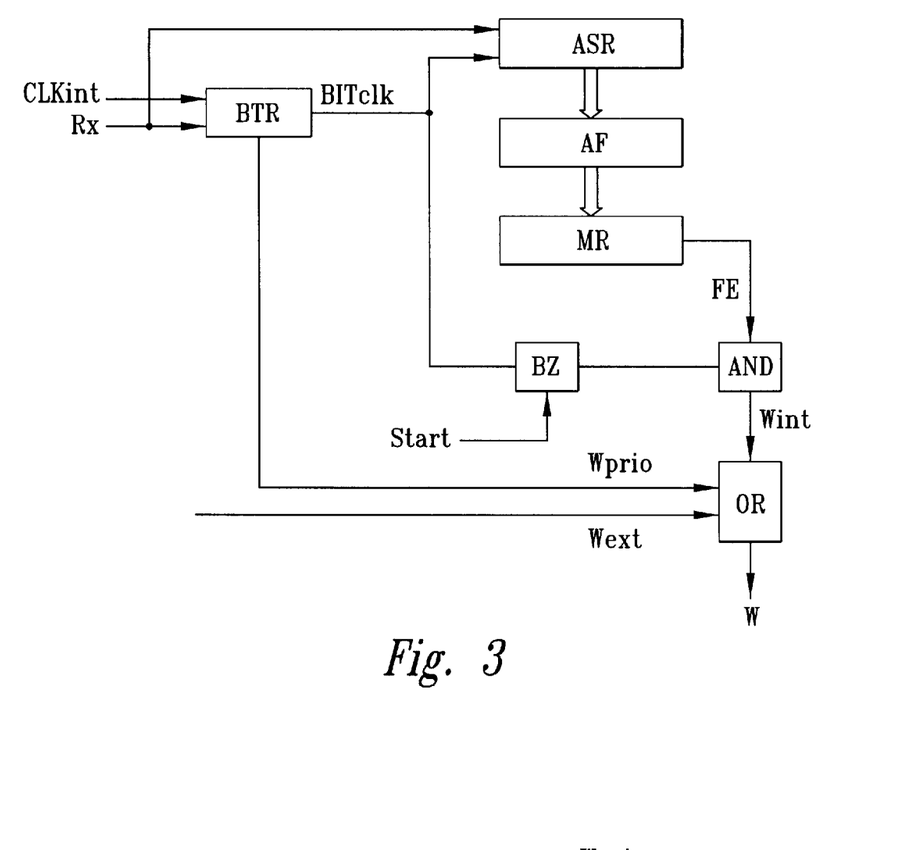
FIG. 3 shows a block diagram of an embodiment of an address identification and bit clock recovering part of an interface according to the invention.

An embodiment of an address filter and bit clock including part of an interface is depicted in FIG. 3 in a block circuit diagram. A bit sequence Rx received via data bus 13 is fed on the one hand to a bit clock recovering means BTR and on the other hand to the input of an address shift register ASR. Address shift register ASR comprises a number of shift register states equal to the number of address bits of a message frame transmitted via data bus 13. As will be elucidated in more detail with reference to FIG. 5, each message frame begins with a frame start bit RSB which precedes the address bits and is already shifted out of address shift register ASR again when all address bits of the respective message frame are in the ASR. The contents of address shift register ASR, however, are each time compared with the contents of an address filter AF, and the respective comparison result is subjected to masking of the kind already elucidated, with the aid of the contents of a mask register MR. An evaluation takes place by an AND operation with the aid of an AND gate AND, whose output signal, depending on whether or not the masked comparison of the received address bits is in conformity with the address bits stored in address filter AF, assumes either a first logic value, for example "0", or a second logic value, for example "1", respectively.

The representation of AND gate AND as a functional block connected downstream of an output of mask register MR is to be understood merely functionally in FIG. 3. In practical circuits, a linkage operation, such as e.g., a multistage linkage, of the memory contents of address shift register ASR, the contents of address filter AF and the contents of mask register MR takes place in reality, possibly with other or additional switching elements than the AND gate AND shown symbolically in FIG. 3

More details in this respect can be taken from the two patent applications mentioned hereinbefore.

The bit clock of the bit sequence of the respective message frame received is recovered by bit clock recovering means BTR. Bit changes thus can be marked also in the event that several bits with the same logic or potential value follow each other in succession and that there are thus no detectable edge changes occurring between such adjacent bits.

As regards the address identification or address recognition of the interface, what is of interest with regard to the bit clock recovering means BTR is just that the same delivers the bit clock of the bit sequence received. This bit clock on the one hand serves for bit clock-controlled reading of the address bits into address shift register ASR and on the other hand for counting the number of the already received bits of the respective message frame by means of a bit counter BZ. When bit counter BZ, whose counting operation is initiated by a start signal generated with the aid of the frame start bit of the particular message frame received, has counted a number of bits equal to the address bit number plus one frame start bit, the bit counter "knows" that all address bits, and only the address bits, must be present in address shift register ASR, and at this moment of time issues via its output a release signal to a release input FE of AND gate AND, whereby the evaluation result thereof is released only at that time at which all address bits, and only the address bits, are contained in address shift register ASR.

When at this release moment, a logic value appears at the output of AND gate AND which signals that the received address is an address intended for the data node DK concerned, this potential value is used as internal wake-up signal Wint in order to wake up the associated microcontroller from the quiescent state to the active state.

Internal wake-up signal Wint, however, is not passed on directly as wake-up signal, but via an OR element OR having three inputs fed with internal wakeup signal Wint, a priority wake-up signal Wprio and external wakeup signal Wext, respectively. When one of these three wake-up signals reaches the OR element OR, a wake-up signal w is produced at the output of OR, which results in activation of voltage controller UR and thus activation of microcontroller MC.

The effect obtainable by priority wake-up signal Wprio consists in that, via a specific content of the respective bit sequence received, all data nodes DK are awakened to an active state. In the embodiment shown in FIG. 3, the priority wakeup signal Wprio is generated with the aid of bit clock recovering means BTR. Details in this respect will be elucidated hereinafter in connection with FIGS. 4 and 5.

Figure 4:
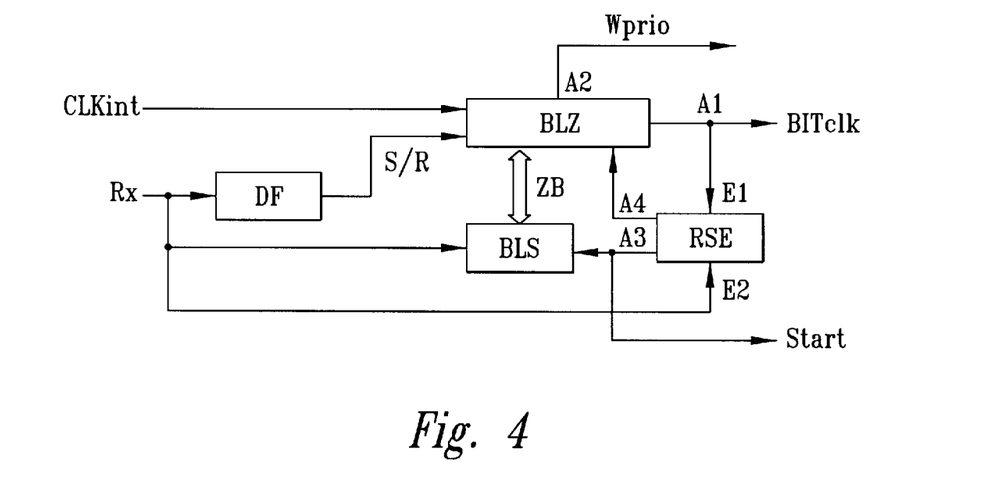
FIG. 4 shows a block diagram of an embodiment of a bit clock recovering part of an interface according to the invention.

A preferred embodiment of a bit clock recovering means BTR is shown in FIG. 4 in the form of a block circuit diagram. It comprises a differentiating member DF fed with the received bit sequence Rx as signal to be differentiated, for example in the form of the bit sequence illustrated in FIG. 5. With every pulse edge of this bit sequence, a negative or a positive differentiating pulse is created at the output of DF, said pulse being applied to a count start/counter resetting input S/R of a bit length counter BLZ. Bit length counter BLZ via an intermediate bus ZB is in data exchange communication with a bit length memory BLS. Bit length counter BLZ is fed with clock pulses CLKint to be counted, from an oscillator (not shown) of interface IF of this data node. The oscillation frequency of this oscillator is considerably higher than the bit clock of the bit sequences Rx transmitted via data bus 13.

The recovered bit clock BITclk is available at a First output A1 of bit length counter BLZ, and the priority wake-up signal Wprio optionally can be tapped at a second output A2 of BLZ.

A frame start recognition means RSE receives via a first input E1 the recovered bit clock BITclk and via a second input E2 the received bit sequence Rx. RSE can also be used for determining the beginning of a message frame, evaluating the respective frame start bit and the bit clocks BITclk of the respective bit sequence received. Upon determining a frame beginning, frame start recognition means RSE issues via outputs A3 and A4 one frame start signal Start each, by means of which bit length counter BLZ is reset at the beginning of a message frame and bit length memory BLS is cleared. The signal Start is used, furthermore, for resetting bit counter BZ of the address recognition means shown in FIG. 3, which resets bit counter BZ with the beginning of a message frame received.

Figure 5:
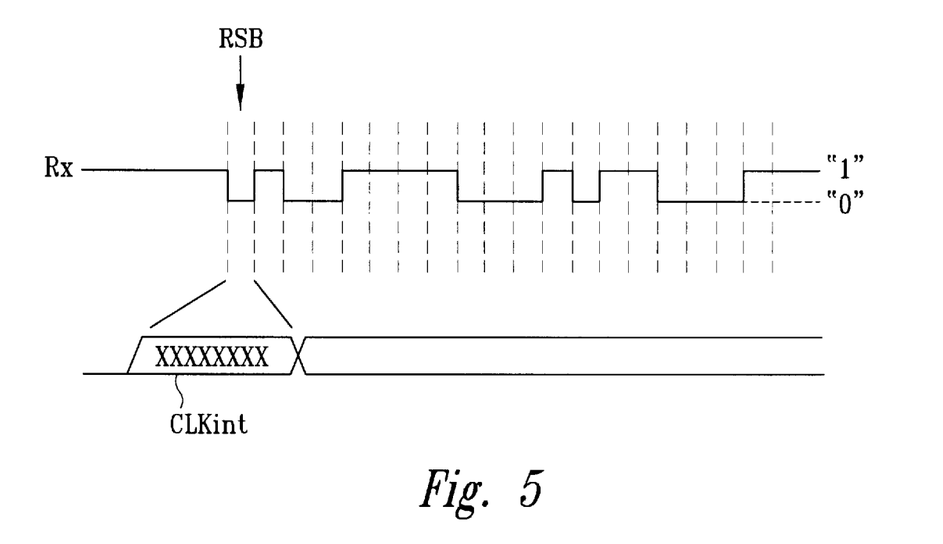
FIG. 5 shows exemplary signal courses in the context according to the present invention.

With the aid of FIG. 5, the function of the bit recovering means BTR shown in FIG. 4 shall be elucidated now.

According to the protocol of conventional CAN data networks data bus 13 is located between the message frames and has a constant logic value "1", and each message frame begins with a frame start bit RSB having the logic value "0". This protocol prescribes, furthermore, that within a message frame there must be no more than a predetermined number of, for example six, successive bits having the same logic value. When frame start recognition means RSE recognizes from the bit sequence Rx supplied via E2 and/or from the recovered bit clock signal supplied thereto via E1 that a larger number of bits of the same logic value than that prescribed according to the protocol is present in succession, it is assumed that the data network is between or outside of message frames. When a logic value change takes place thereafter, namely to logic value "0", during the frame start bit RSB of a message frame received now, frame start recognition means RSE recognizes this as frame beginning and at this time effects resetting, of BLZ and clearing of BLS.

The edge change from logic value "1" to logic value "0" occurring at the beginning of a frame start bit RSB, furthermore, triggers a counting start pulse at the output of differentiating member DF, which starts bit length counter BLZ to count the internal clock pulses CLKint supplied thereto. When in the bit sequence shown in FIG. 5, an edge change in positive direction occurs at the end of frame start bit RSB, this initiates a counting, stop for bit length counter BLZ at the output of differentiating member DF. At the same time, storing of the count reached by bit length counter BLZ at this moment of time in bit length memory BLS takes place in a control operation, which keeps this count stored for the remainder of the just occurring message frame.

Upon transfer of the count reached at the end of RSB to bit length memory BLS, bit length counter BLZ is reset and started for a new counting operation. With each subsequent edge change of Rx, bit length counter BLZ is reset again and started for a new Counting operation. Due to the fact that there may be several successive bits with the same logic value present in a bit sequence of a message frame, as shown in exemplary manner in FIG. 5, an edge change is not available at every bit change location as well, so that bit length counter BLZ in the event of such successive identical logic values would not be reset at the bit change location. In order to be able to detect also the bit change locations between successive bits with the same logic value, the count of BLZ is continuously compared with the count stored in BLS and BLZ is reset also when it has reached a count after the respective counting beginning that is equal to the count stored in BLS. Consequently, resetting of BLZ takes place each time when either an edge change of bit sequence Rx has been ascertained with the aid of differentiating member DF or when BLZ has reached a count equal to the count stored in BLS.

With each resetting operation of BLZ, a bit clock pulse appears at the output A1 thereof, and the sequence of these bit clock pulses represents the recovered bit block BITclk.

With the aid of the continuous comparison of the count of BLZ with the count stored in BLS, bit change locations thus can be marked by the appearance of bit clock pulses BITclk also in Such cases when no edge changes take place. In this manner, it is not only possible to mark the bit change locations within the bit sequence of a currently received message frame, but the recovered bit clocks can also be generated between the message frames when the bit clock recovering means BTR is designed and controlled in such a manner that the memory content orbit length memory BLS is maintained also after the end of a message frame and clearing thereof is effected only with the beginning of the frame start bit RSB of a subsequent message frame.

In the embodiment shown in FIG. 4, it is assumed that bit length counter BLS itself is capable of recognizing the beginning of a frame start bit. Another possibility would be to have bit length memory BLS evaluate the differentiated signal at the output of differentiating member DF.

Frame start recognition means RSE may be composed with a counter which on the one hand can detect the edges of Rx (possibly with the aid of the output signals of differentiating member DF) and on the other hand is reset with each of these edges and started to perform a counting operation in which it counts clock pulses of a predetermined clock, for example of the recovered bit clock BITclk. When the respective count of RSE exceeds a count signaling that the last edge change took place a longer time ago than permitted according to the protocol within the bit sequence of an admissible message frame, it is assumed that a frame pause or frame interval is present and that a subsequent edge change must be the beginning of a frame start bit RSB.

The bit following frame start bit RSB is the first address bit of the respective message frame. When this first address bit, differently from the example shown in FIG. 5, has the same logic value "0" as frame start bit RSB, the counting operation of bit length counter BLZ initiated with the beginning of RSB is not stopped at the end of RSB since there is no differentiating pulse delivered at that time by differentiating member DF. This has the result that bit length counter BLZ continues its counting operation beyond the end of RSB, and taking over of the count in bit length memory BLS takes place only when a first edge change since the beginning of RSB takes place. Bit length counter BLZ thus reaches a count which—also in consideration of the frequency inaccuracy of the interface oscillator delivering the internal counting clock CLK—is far above the count that should be reached at the end of frame start bit RSB. This behavior is utilized purposefully for priority waking-up. When waking-up of data nodes is to be effected not by recognition of addresses intended for them, but independently of such address recognition, the data node desiring to wake up the other data nodes in address-unspecific manner merely needs to transmit a data frame in the bit sequence of which the frame start bit RSB with logic value "0" is followed by a first address bit having the same logic value "0". This leads in the bit length counters of the interfaces of all data nodes to the effect that a count is reached that is above the count that can be reached at the end of a frame start bit RSB. When the bit length counter BLZ of the interface of each data node that is supposed to participate in a priority wake-up operation, is set up such that, when a predetermined count is reached which also with respect to a frequency-inaccurate interface oscillator is with certainty higher than the count obtainable at the end of a frame start bit, a priority wake-up signal Wprio is output via output A2, all data nodes participating in the priority wake-up process can be awakened in common in that the transmitting data node intending to initiate the priority wake-up operation transmits a data frame having such a bit sequence that frame start bit RSB with logic value "0" is followed by a first address bit having the same logic value "0".

In the usual case, each microcontroller MC comprises a quartz oscillator of its own with high frequency stability, which is used for clock control of the microcontroller. As such quartz oscillators are relatively expensive, it would be advantageous to make the clock control of the respective microcontroller not dependent on such a quartz oscillator of its own, but to carry out an external clock control as seen from the microcontroller.

Figure 6:
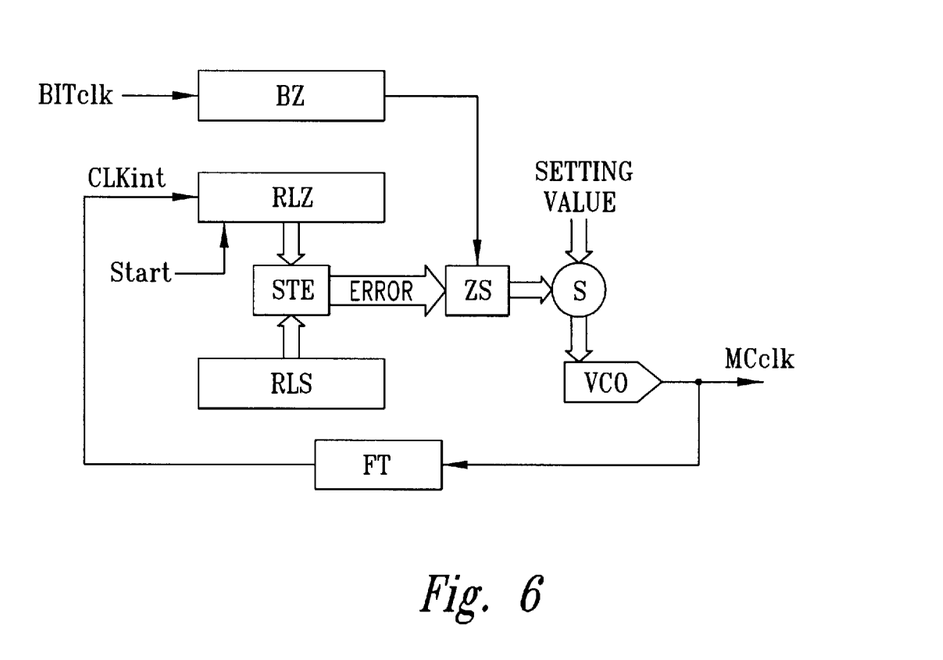
FIG. 6 shows a block diagram of an embodiment of an oscillator of a data node, which is tunable via a bus line.

A circuit arrangement enabling such a design is shown in FIG. 6 in a block circuit diagram. This circuit arrangement renders possible tuning of an interface oscillator of moderate frequency accuracy to a bit clock with high frequency accuracy of a bit sequence received via the data bus. The output signal of the interface oscillator made frequency-accurate in this way can then be used as clock control signal for the associated microcontroller having no oscillator of its own.

The circuit arrangement shown in FIG. 6 comprises a voltage-controlled oscillator VCO whose output signal delivers the clock signal MCclk for the microcontroller MC of the data node DK concerned. For example, VCO produces a clock frequency of 10 MHz. This clock signal MCclk is fed to a frequency divider FT having a predetermined frequency divider factor, and at the output thereof internal clock CLKint is available. CLKint is fed to a counting input of frame length counter RLZ having a resetting input RESET to which frame start signal Start is supplied from frame start recognition means RES in FIG. 4, in order to reset frame length counter RLZ with the beginning of each new message frame. In addition thereto, there is provided a frame length nominal value generator RLS in which a count is defined corresponding to a predetermined nominal frame length. By means of a subtracting means STE, the respective count of frame length counter RLZ is continuously compared to the frame length nominal value. A difference resulting from this comparison is fed as ERROR to a release-dependent temporary memory ZS and, upon release through the same, reaches a summing circuit S. By means of summing circuit S, the respective, actual error is added to a setting value leading to the desired frequency of VCO when the error delivered from STE is zero, and the frequency of VCO is thus corrected.

Due to the fact that frame length counter RLZ is reset only by the respective frame start bit RSB, i.e. after a period of time in excess of the frame length, a bit counter BZ is provided, for which also bit counter BZ present in FIG. 3 may be employed, by means of which a predetermined frame length can be counted corresponding to a predetermined number of bits starting from the frame beginning. When the corresponding bit number or frame length has been reached, temporary memory ZS is released in order to pass the then present ERROR on to summing circuit S. When all message frames have the same bit number and thus the same frame length, bit counter BZ can be designed such that it delivers the release signal for the release-dependent temporary memory ZS each time at the actual frame end. In the event that the message frames delivered via data bus 13 may have different frame lengths, bit counter BZ is set up such that it counts, starting from resetting by frame start bit RSB, a bit number and thus a frame length which is at the most as large as the smallest possible frame length of all possible message frames.

Tuning of the controlled oscillator takes place as follows:

In the event that VCO delivers exactly its nominal frequency, a specific number of clock pulses CLKint fits into the frame length defined with the aid of bit counter BZ or into the evaluation period (when the latter is shorter than an actual frame length) defined by means of bit counter BZ, respectively. This specific number of clock pulses leads to a specific, corresponding count of frame length counter BLZ at the end of the frame length or evaluation period, respectively. In frame length nominal value generator RLS, there is deposited a nominal value corresponding exactly to this Count. When VCO has its nominal frequency, the error ascertained with the aid of STE is zero, and VCO is controlled exclusively by the setting value. When the frequency of VCO is different from the nominal frequency value, a different count than that deposited in RLS is reached within the frame length or evaluation period of RLZ, respectively. This leads then to a corresponding ERROR and a corresponding deviation of the control signal fed to the control input of VCO from the setting value. This leads to a corresponding change of the frequency delivered by VCO and thus of microcontroller clock MCclk delivered to microcontroller MC.

Though it is no longer necessary for all microcontrollers of the entire data network to have an independent quartz oscillator of their own each, a quartz oscillator with high frequency accuracy nevertheless has to be provided at some location or other in the overall system, which determines the frequency and thus the clock rate for the entire remainder of the data system. To this end, a data node may be provided as a clock master, and the microcontroller thereof can be provided with a quartz oscillator. The clock master preferably is awakened by each wake-up signal in the entire data network and as a result thereof reacts with the emission (preferably several times) of a predetermined clock definition bit sequence to data bus 13. The frame start bit of this clock definition bit sequence brings the interfaces of all data nodes to a passive monitoring state in which their address filters are active. The clock definition bit sequence in this case is designed such that it has a higher priority associated therewith than messages that can be delivered from all other data nodes than the clock master. It is ensured thereby that the interfaces of all other data nodes consider themselves addressed by the emission of a clock definition bit sequence of the clock master, and that a frequency synchronization takes place in all of these interfaces as elucidated by way of FIG. 6. There is no need for awakening the microcontrollers of these data nodes for this frequency retuning operation.

In order to ensure synchronization of the interface oscillators VCO of all of these data nodes with the clock of the clock master, the data network preferably is organized such that no messages are transmitted during the transmission of the clock definition bit sequences. By a corresponding design of the clock definition bit sequence and the clock synchronization circuits in the individual data nodes, it is also possible to achieve the effect that the clock synchronization circuits, for example of the type shown in FIG. 6, are responsive only to clock definition bit sequences, but not to message bit sequences.

Frequency divider FT in FIG. 6 takes care that the maximum count for which frame length counter RLZ has to be designed need not be too high and that it is thus possible to make do with a smaller counter containing fewer counting stages.

What is claimed is:

1. A data node for a data network comprising a plurality of data nodes interconnected by means of a bus line and selectively activatable by address codes transmitted via the bus line, wherein the data node comprises:
  a microcontroller switchable between inactive and active operation modes;
  an interface interconnected between the bus line and the microcontroller; and
  an address filter configured to recognize an activating demand intended for the microcontroller to initiate switching of the microcontroller from the inactive to the active operation modes, the address filter located in the interface.

2. The data node of claim 1, comprising an address shift register for temporarily storing an address bit sequence received via the bus line, a filter register for permanently storing an address bit sequence corresponding to the address of the data node considered, and a comparison means for comparing the respective address bit sequence stored in the address shift register with respect to conformity with the address bit sequence stored in the filter register, the comparison means generating a comparison result signal which is in the form of a wake-up signal when it ascertains conformity between the temporarily stored address bit sequence and the permanently stored address bit sequence.

3. The data node of claim 2, the interface, comprising a mask by means of which, with respect to predetermined address bit locations, conformity between temporarily stored address bit sequence and permanently stored address bit sequence can be signaled irrespective of whether or not there is actually conformity for such an address bit location.

4. The data node of claim 2, wherein the comparison result signal of the comparison means can be released only upon receipt of a release signal, and comprising a bit counter adapted to count the bit locations of the respective bit sequence received and delivering a release signal to the comparison means upon reaching a predetermined bit count.

5. The data node of claim 2, wherein the output of the comparison means has an OR element connected downstream thereof which subjects an output signal of the comparison means to an OR operation with an external wake-up signal and/or a priority wake up-signal.

6. The data node of claim 1, comprising a bit clock recovering means for recovering the bit clock of the bit sequences received via the bus line.

7. The data node of claim 6 for a data network, wherein bit sequences are sent in the form of frames via the bus line and each frame starts with a characteristic frame start bit followed by the address bits and thereafter by data bits:

comprising a differentiating member differentiating the pulse edges of the respective bit sequence as differentiating pulses of first and second polarity, respectively;

a bit length counter to which counting clock pulses of a counting clock oscillator can be supplied as pulses to be counted, to which the differentiating pulses of one polarity can be fed as counting start signals and the differentiating pulses of the other polarity as counter resetting signals, which at each resetting operation issues a bit change signal representing the recovered bit clock, and which is adapted to be reset at the beginning of a received frame start bit;

and a bit length memory the memory contents of which can be cleared at the respective frame start and in which, at the end of the respective frame start bit, the then reached Count of the bit length counter can be stored;

the Count of the bit length counter being continuously compared to the bit length memory value and the bit length counter being reset each time it reaches the bit length memory value.

8. The data node of claim 7, comprising a frame start recognition means by means of which the frame start of the respective bit sequence transmitted is recognizable and by means of which, at the frame beginning of a bit sequence, the bit length counter is adapted to be reset and the bit length memory is adapted to be cleared.

9. The data node of claim 8, for a data network according to the protocol of which not more than a prescribed number of successive equal bit logic values may occur within a frame of a transmitted bit sequence, wherein the frame start recognition means is fed with the bit clock pulses available at the output of the bit length counter and with the received bit sequence.

10. The data node of claim 1, comprising an oscillator of moderate frequency accuracy which is tunable by means of characteristic quantities of received bit sequences and determines the clock control of a data processing means belonging to the interface.

11. The data node of claim 10, for a data network in which bit sequences are sent in the form of frames via the bus line and each frame starts with a characteristic frame start bit followed by address bits and thereafter by data bits, comprising a controllable oscillator, a frame actual length counter having a counting clock input, a frame nominal length presetting means, a comparison means comparing frame actual length and frame nominal length with each other, and a summing means by means of which the Output signal of the comparison means can be added to a frequency setting value presetting a nominal frequency of the oscillator, an output of the summing means being coupled with the control input of the oscillator and an oscillator output being coupled with the counting clock input of the frame actual length counter.

12. The data node of claim 11,
comprising a release-dependent temporary memory disposed between the comparison means and the summing means and having a release input which, when a release signal is applied thereto, releases a transfer of the temporarily stored comparison result to the summing means,
and a bit counter by means of which the number of bits occurring as from the frame start bit of a bit sequence can be counted and which, upon reaching a predetermined count, delivers a release signal to the temporary memory.

13. The data node of claim 11,
wherein a frequency divider is connected between the oscillator output and the counting clock input of the frame actual length counter.

14. The data node of claim 1 comprising: a power supply; and
a voltage controller, the voltage controller connected to the power supply to received power and connected to to the microcontroller to supply power when the address filter of the interface has recognized an activating demand for the microcontroller.

15. The data node of claim 14 wherein the data network has a bus line comprising a data bus and a voltage supply line; and wherein the interface couples the voltage controller with the voltage supply line when the address filter of the interface has recognized an activating demand for the microcontroller.

16. A data node of a data network having a plurality of data nodes interconnected by means of a bus line via which bit sequences can be transmitted, the data node comprising:
a microcontroller having quiescent and active states; and
a bit clock recovering means for recovering the bit clock of bit sequences received by the data node via the bus line without need for the microcontroller to be in its active state.

17. The data node of claim 16,
comprising a frame start recognition means by means of which the frame start of the respective bit sequence transmitted is recognizable and by means of which, at the frame beginning of a bit sequence, the bit length counter is adapted to be reset and the bit length memory is adapted to be cleared.

18. The data node of claim 17,
for a data network according to the protocol of which not more than a prescribed number of successive equal bit logic values may occur within a frame of a transmitted bit sequence,
wherein the frame start recognition means is fed on the one hand with the bit clock pulses available at the output of the bit length counter and on the other hand with the received bit sequence.

19. The data node of claim 16,
comprising an oscillator of moderate frequency accuracy which is tunable by means of characteristic quantities of received bit sequences and determines the clock control of a data processing means belonging to the interface.

20. The data node of claim 19, for a data network in which bit sequences are sent in the form of frames via the bus line and each frame starts with a characteristic frame start bit followed by address bits and thereafter by data bits,
comprising a controllable oscillator,
a frame actual length counter having a counting clock input,
a frame nominal length presetting means,
a comparison means comparing frame actual length and frame nominal length with each other,
and a summing means by means of which the output signal of the comparison means can be added to a frequency setting value presetting a nominal frequency of the oscillator,
an output of the summing means being coupled with the control input of the oscillator and an oscillator output being coupled with the counting clock input of the frame actual length counter.

21. The data node of claim 20,
comprising a release-dependent temporary memory disposed between the comparison means and the summing means and having a release input which, when a release signal is applied thereto, releases a transfer of the temporarily stored comparison result to the summing means,
and a bit counter by means of which the number of bits occurring as from the frame start bit of a bit sequence can be counted and which, upon reaching a predetermined count, delivers a release signal to the temporary memory.

22. The data node of claim 20,
wherein a frequency divider is connected between the oscillator output and the counting clock input of the frame actual length counter.

23. The data node of claim 20,
comprising a release-dependent temporary memory disposed between the comparison means and the summing means and having a release input which, when a release signal is applied thereto, releases a transfer of the temporarily stored comparison result to the summing means,
and a bit counter by means of which the number of bits occurring as from the frame start bit of a bit sequence can be counted and which, upon reaching a predetermined count, delivers a release signal to the temporary memory.

24. The data node of claim 20,
wherein a frequency divider is connected between the oscillator output and the counting clock input of the frame actual length counter.

25. The data node of claim 16 for a data network,
wherein bit sequences are sent in the form of frames via the bus line and each frame starts with a characteristic frame start bit followed by the address bits and thereafter by data bits;
comprising a differentiating member differentiating the pulse edges of the respective bit sequence as differentiating pulses of first and second polarity, respectively;
a bit length counter to which counting clock pulses of a counting clock oscillator can be supplied as pulses to be counted, to which the differentiating pulses of one polarity can be fed as counting start signals and the differentiating pulses of the other polarity as counter resetting signals, which at each resetting operation issues a bit change signal representing the recovered bit clock, and which is adapted to be reset at the beginning of a received frame start bit;
and a bit length memory the memory contents of which can be cleared at the respective frame start and in which, at the end of the respective frame start bit, the then reached count of the bit length counter can be stored;

the count of the bit length counter being continuously compared to the bit length memory value and the bit length counter being reset each time it reaches the bit length memory value.

26. A data node of a data network having a plurality of data nodes interconnected by means of a bus line via which bit sequences can be transmitted, the data node comprising:

a microcontroller having quiescent and active states; and an interface having an oscillator of moderate frequency accuracy which is tunable by means of characteristic quantities of received bit sequences and determines the clock control of a data processing means belonging to the interface without need for the microcontroller to be in its active state.

27. The data node of claim 26, for a data network in which bit sequences are sent in the form of frames via the bus line and each frame starts with a characteristic frame start bit followed by address bits and thereafter by data bits, comprising a controllable oscillator, a frame actual length counter having a counting clock input, a frame nominal length presetting means, a comparison means comparing frame actual length and frame nominal length with each other, and a summing means by means of which the output signal of the comparison means can be added to a frequency setting value presetting a nominal frequency of the oscillator, an output of the summing means being coupled with the control input of the oscillator and an oscillator output being coupled with the counting clock input of the frame actual length counter.

28. A data network comprising a plurality of data nodes interconnected by means of a bus line and selectively activatable by address codes transmitted via the bus line, each data node comprising:

a microcontroller switchable between inactive and active operation modes;

an interface interconnected between the bus line and the microcontroller; and an address filter configured to recognize an activating demand intended for the microcontroller to initiate switching of the microcontroller from the inactive to the active operation modes, the address filter located in the interface.

29. The data network of claim 28, wherein each interface comprises a bit clock recovering means for recovering the bit clock of the bit sequences received via the bus line.

30. The data network of claim 28, wherein each interface comprises an oscillator of moderate frequency accuracy which is tunable by means of characteristic quantities of received bit sequences and determines the clock control of a data processing means belonging to the interface.

31. The data node of claim 28 comprising a power supply; and a voltage controller, the voltage controller connected to the power supply to received power and connected to the microcontroller belonging to an intended data node to supply power when the address filter of the interface belonging to the intended data node has recognized an activating demand for said microcontroller.

32. The data node of claim 31 wherein the data network has a bus line comprising a data bus and a voltage supply line; and wherein the interface couples the voltage controller with the voltage supply line when the address filter of the interface belonging to the intended data node has recognized an activating demand for the microcontroller belonging to the intended data node.

33. A data network comprising a plurality of data nodes interconnected by a bus line via which bit sequences can be transmitted, each data node having a microcontroller and an interface, the microcontroller having quiescent and active states, the interface comprising a bit clock recovering circuit for recovering the bit clock of the bit sequences received via the bus line without need for the microcontroller to be in its active state.

34. A data network comprising a plurality of data nodes interconnected by means of a bus line via which bit sequences can be transmitted, each data node having a microcontroller and an interface, the microcontroller having quiescent and active states, the interface comprising an oscillator of moderate frequency accuracy which is tunable by means of characteristic quantities of received bit sequences and determines the clock control of a data processing means belonging to the interface without need for the microcontroller to be in its active state.

* * * * *